United States Patent [19]

Kamat

[11] Patent Number: 4,814,225
[45] Date of Patent: Mar. 21, 1989

[54] FUSIBLE INTERLINING FABRIC USING HIGH WET MODULUS RAYON

[75] Inventor: Dattatraya V. Kamat, Yardley, Pa.

[73] Assignee: Crown Textile Company, Jenkintown, Pa.

[21] Appl. No.: 14,976

[22] Filed: Feb. 17, 1987

Related U.S. Application Data

[63] Continuation-in-part of Ser. No. 830,221, Feb. 18, 1986, Pat. No. 4,719,144.

[51] Int. Cl.$^4$ ............................................. B32B 7/00
[52] U.S. Cl. ................................... 428/253; 66/202; 428/198; 428/224; 428/288
[58] Field of Search ............... 66/202; 428/198, 253, 428/225, 288, 224

[56] References Cited

U.S. PATENT DOCUMENTS

| | | | |
|---|---|---|---|
| Re. 31,380 | 9/1983 | Smith et al. | 106/204.1 |
| 2,090,547 | 8/1937 | Neaves | 139/426 R |
| 2,122,175 | 6/1938 | Coulter | 139/426 R |
| 2,204,094 | 6/1940 | Meier | 139/426 R |
| 2,231,549 | 2/1941 | Rockett | 139/426 R |
| 2,388,140 | 10/1945 | Hall | 139/420 R |
| 2,423,707 | 7/1947 | Kenyon et al. | 139/426 R |
| 2,757,435 | 8/1956 | Bihaly | 139/420 R |
| 3,049,826 | 8/1962 | Goldsmith | 139/420 R |
| 3,144,671 | 8/1964 | Gould et al. | 139/420 R |
| 3,491,802 | 1/1970 | Mortensen et al. | 139/420 R |
| 4,719,144 | 1/1988 | Kamat | 428/257 |

Primary Examiner—James J. Bell
Attorney, Agent, or Firm—Robert C. Podwil

[57] ABSTRACT

A non-resin treated fusible interlining fabric comprises, in a woven embodiment, high wet modulus rayon in the warp and filling, and in a knit embodiment, high wet modulus rayon in a weft-inserted yarn. Non-woven fabric using high wet modulus rayon is also disclosed. The fabrics provide improved dimensional control, hand, drape, bond strength and fusing performance.

13 Claims, 1 Drawing Sheet

FUSIBLE INTERLINING FABRIC USING HIGH WET MODULUS RAYON

This application is a continuation of Ser. No. 06/830,211 filed 02/18/86 now U.S. Pat. No. 4,719,144.

FIELD OF THE INVENTION

This invention relates generally to fusible interlining fabrics, and more particularly, to interlining fabrics using high wet modulus rayon, and having improved dimensional control, mobility of fibers, bond strength and fusing durability despite repeated dry cleaning and steaming The present invention provides an interlining fabric which achieves satisfactory shrinkage control without the need for conventional resin treatment.

BACKGROUND OF THE INVENTION

In the manufacture of various types of garments, it is conventional practice to attach a stiffening insert, usually referred to as an interlining, to the body or shell fabric of certain parts of the garment. Suit, shirt or blouse shoulders, fronts, collars and cuffs, in conventional practice, frequently incorporate an interlining. The interlining is conventionally adhered or fused to the shell fabric by bonding of a thermoactive adhesive material, applied as a coating or by printing in spaced deposits or dot patterns, to one side of the interlining fabric. The interlining fabric is then placed adjacent to the shell fabric, with the thermoactive adhesive material in contact with the shell fabric, and subjected to an ironing or pressing operation which softens the thermoactive material and causes the interlining fabric to adhere to the shell fabric.

Interlining fabrics may be produced of woven, knit (weft inserted), or nonwoven material. Woven or knit interlining fabrics are desirable for their inherent resiliency, drape and strength characteristics, but have sometimes proven less capable than nonwoven materials, which have a smooth surface, of achieving satisfactory bonding to the shell fabric. Moreover, many knitted or woven interlining fabrics have high shrinkage potential, and shrinkage of an interlining causes buckling or puckering of the shell fabric, and degradation of the appearance of the garment. Conventional woven, weft inserted and saturated nonwoven fabrics containing regular rayon or cotton show significant shrinkage upon wetting, dry cleaning or washing or subjected to steam in garment refurbishing processes.

In order to minimize shrinkage of woven or knitted interlinings, it is conventional to subject such fabrics to resin treatment, which serves to "set" the fibers and yarns of the fabric with respect to each other. Minimizing shrinkage by resin treatment, however, inherently decreases the desirable mobility of the fibers, degrading the hand and drape of the interlining and ultimately of the garment itself. The hand of resin-treated interlinings tends to be firm, and the fabric brittle. In some cases, the brittleness results in flaking (so-called "dusting") of the resin-treated yarn. Resin treatment also reduces bondability and fusing performance of the fabric.

SUMMARY OF THE INVENTION

With the above as background, it is an object of the present invention to provide an interlining fabric adapted to be fused to a shell fabric, and which is characterized by a soft drapable hand, the fabric being made of yarns comprising high wet modulus rayon. High wet modulus rayon has heretofore been used in fabrics to exploit the strength advantage of high wet modulus rayon fibers over conventional rayon. The present interlining fabric provides, without the need for resin treatment, unexpectedly favorable dimensional control and shrinkage characteristics, as well as mobility of fibers, improved bond strength and improved fusing performance. Interlining fabrics in accordance with the invention also exhibit reduced "strikeback" of adhesive material and a desirable nap.

In a presently preferred form of the invention, the yarns of the warp and filling of a woven interlining fabric comprise high wet modulus rayon. Other embodiments of the invention may employ other fibers, such as polyester-rayon blends for the warp. Weft-inserted knit interlining fabrics using high wet modulus rayon also provide better dimensional control and overall fusing performance superior to resin treated fabrics. Currently used saturated nonwoven fabrics using rayon are known to have high washing shrinkage, but in saturated nonwoven embodiments of the present interlining fabric, shrinkage and fusing performance can be controlled.

In woven embodiments of the present interlining fabric, the pattern of the weave may be varied as desired to control the stability, stiffness, shape retention and tensile strength of the fabric, the high wet modulus rayon composition of the fabric providing the desired dimensional stability and other desirable characteristics mentioned above.

DETAILED DESCRIPTION

Figure 1:
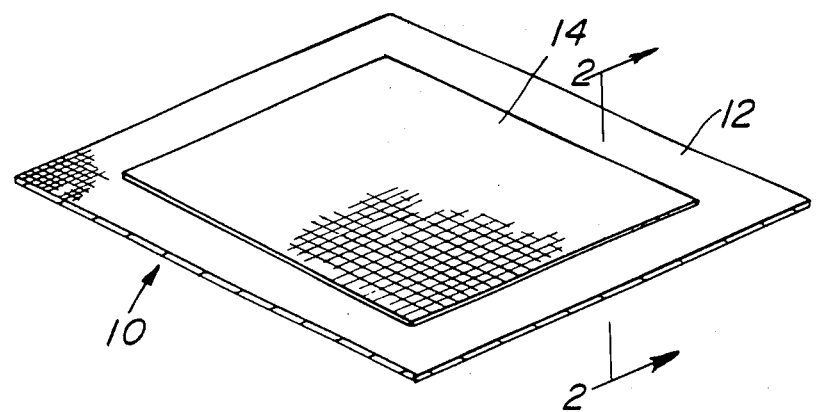
FIG. 1 is a fragmentary view of a garment shell fabric, with one embodiment of the fusible interlining fabric of the present invention adhered to its rear surface.
Figure 2:
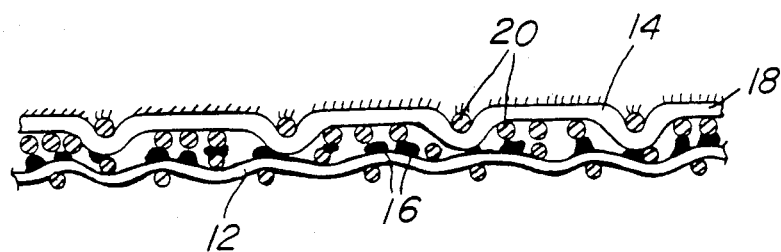
FIG. 2 is a greatly enlarged sectional view, taken substantially along the line 2—2 in FIG. 1, and showing the construction of a woven embodiment of the present interlining fabric.

Referring now to the drawings in detail, wherein like reference numerals indicate like elements, there is seen in FIG. 1 a fused structure, designated generally by the reference numeral 10, consisting of a shell fabric 12, to which there is fused a woven interlining fabric 14 in accordance with the present invention. The interlining fabric 14 is fused to the shell fabric 12 by spaced deposits of thermoactive adhesive coating material 16.

In the illustrated embodiment, the interlining fabric 14 consists of warp yarns 18 and filling yarns 20, woven in a 76 ends, 28 picks per inch, 3×1 broken twill construction, floating warp side napped (as indicated by the reference numeral 22), and with the filling side coated with the thermoactive adhesive coating material. The interlining fabric 14 has no resin treatment.

As is explained in greater detail below, in accordance with the invention, the warp yarns 18 and filling yarns 20 may contain high wet modulus rayon.

As used herein, "high" as applied to the modulus of rayon fiber means a wet modulus, at 5% elongation, above about 6 at 55% relative humidity and temperature of 75° F. By way of illustration, Avtex Fibers Inc., of Front Royal, Va., supplies a family of high wet modulus rayon fibers, sold under the registered trademarks "FIBER FORTY" Rayon ("AVRIL" Rayon), "FIBER FORTY-THREE" Rayon, "PRIMA" Rayon, and "AVRIL III" Rayon, having various cross sections and other physical properties. These fibers have stated wet moduli of between 6.0 and 9.2. Typically, high wet modulus rayon fibers are stronger than regular rayons, particularly when wet, and they are, at present, marketed and promoted for their strength. The present invention uses them to achieve superior performance in dimensionally stabilized structures of fusible fabrics, particularly in the area of bond durability through dry cleaning and live steaming of the fused structures.

The relative amounts of high wet modulus rayon in a given fabric may be varied and optimized to yield the desired dimensional control, hand and drape, bond strength and fusing performance for a particular application.

In this regard, it has been found that aesthetic characteristics (such as hand and drape) and the technical performance (such as shrinkage resistance, bond strength and fusing durability) of interlining fabrics in accordance with the invention may be optimized by varying the content of the warp and filling yarns. Rayon, a cellulosic fiber, provides a soft hand, but in high concentrations in conventional applications, generally requires resin treatment to control shrinkage. Resin treatment, however, tends to immobilize and stiffen the fibers, degrading the hand, and also reducing bondability and the durability of the fused bond.

Polyester, another fiber which may be used to advantage in the present interlining fabrics, tends to be dimensionally stable, and is not moisture sensitive, but in high concentrations it imparts to fabrics aesthetic properties less desirable than rayon.

In presently contemplated forms of the invention, the warp yarns 18 contain about 50% high wet modulus rayon and 50% other fibers, such as polyester, and may contain from about 30% to 100% high wet modulus rayon. The filling yarns 20 preferably contain in excess of about 70% high wet modulus rayon with the remainder being other fibers, and may comprise up to 100% high wet modulus rayon, a presently preferred range being in excess of 75% high wet modulus rayon, with the remainder other short fibers. The other fibers may comprise wool, such as wool noil.

Comparative trials were conducted, using similarly constructed woven interlining fabrics (3×1 broken twill), to explore possibilities for the control of shrinkage in the filling of woven and weft-inserted knit interlinings. Each of the fabrics had a conventional warp of 77 ends per inch 30/1 polyester-rayon, 50/50 percent, and one had a conventional filling of 28 picks per inch 100% regular rayon 10/1 yarn. The other fabric, made in accordance with the invention, had as its filling 28 picks per inch of a high wet modulus rayon yarn (10/1 ring spun "AVRIL III" natural multilobal high wet modulus rayon, from Avtex).

The sample with high wet modulus rayon substituted for regular rayon as the filling was compared to the conventional interlining fabric in a shrinkage test conducted by "wet out" laundering and tumble drying of the fabrics themselves. The results are tabulated in Table I below:

TABLE I

| Fabric Description | Shrinkage - Warp/Filling (%) |
| --- | --- |
| Warp 30/1 Polyester/regular rayon 50/50 percent; Filling 10/1 regular rayon; 10% resin treatment | −1.8 −3.7 |

TABLE I-continued

| Fabric Description | Shrinkage - Warp/Filling (%) |
| --- | --- |
| Warp 30/1 Polyester/regular rayon; Filling 10/1 HWM rayon No resin treatment | −3.5 −3.0 |

Although, as expected, the warp of the non-resin treated sample exhibited greater shrinkage than the resin-treated control sample, the high wet modulus rayon filling showed substantially less shrinkage of the filling than even the treated control sample.

In another tests, a woven interlining fabric was made of a construction and with warp and filling yarn counts as above, but with a warp consisting of 30/1 polyester—high wet modulus rayon, 50/50 percent and a filling of 10/1 regular rayon. No resin treatment was used. The fabric was subjected to wet out laundering and tumble drying as above. It showed warp and filling shrinkage of −2.0 percent and −9.0 percent, respectively, a result which confirms the advantage for the present purposes of using high wet modulus rayon in the warp.

Interlining fabrics of the kinds referred to in Table I above were also evaluated relative to each other for bond strength and fusing performance and relative to a fabrics similar in composition to the above-mentioned control (resin-treated) fabric, but with a 6% resin treatment. All of the fabrics were coated with 180 dots per square inch of polyamide polymer at a coating add-on of 0.5 oz./square yard.

Samples of the kinds referred to in Table I were fused at 280° F. (at the line of fusion) for 14 seconds, at 5 psi pressure, to a hard-to-fuse 100% wool worsted shell fabric. They were then post-pressed twice, dry-cleaned three times, and steamed for 30 seconds or until failure. The results of these tests are set forth in Table II below:

TABLE II

| Filling | 30 secs. | 60 secs. | 90 secs. |
| --- | --- | --- | --- |
| 10/1 High Wet Modulus Rayon No resin treatment | OK | OK | Localized delamination |
| 10/1 Regular rayon 10% Resin Treatment | Localized delamination | — | — |
| 10/1 Regular rayon 6% Resin Treatment | Localized delamination | — | — |

Bond strengths were greater than 5 lbs. (per inch) for all of the high wet modulus samples. The 6% resin-treated sample exhibited bond strengths between about 2.0 and about 2.5 lbs. per inch; the 10% resin-treated sample exhibited bond strengths of around 1.5 lbs. per inch (about 1.3 to about 1.7). The high wet modulus sample was judged to present the most desirable hand of the three samples.

Surface appearances were satisfactory for all three samples prior to failure.

The present invention may be embodied in knit interlining fabrics, as well as woven fabrics.

In such embodiments, the fusible interlining fabric comprises weft-inserted knits of conventional construction (such as, for example, the knit illustrated in FIG. 1 of U.S. Pat. No. 4,450,196, issued May 22, 1984, to Kamat), in which the weft-inserted yarn has fiber characteristics like those of the filling yarns of the above-described woven counterparts. In one example of a presently preferred knit fabric, the stitch yarn is 40 denier multifilament polyester, although 20 denier monofilament polyester, 70 denier multifilament nylon, or 150 denier multifilament polyester/nylon will also suffice, and the weft-inserted yarn comprises in excess of about 70% high wet modulus rayon with the remainder other fibers, a presently preferred range being in excess of 75% high wet modulus rayon. In another exemplary knit embodiment, the weft-inserted yarn comprises a blend of about 50/50 percent polyester and high wet modulus rayon.

In a non woven embodiment, the invention may be practiced through the use of a non-woven fabric which comprises an intimate blend of carded fibers, dry-laid and bound, preferably by an acrylic binder. The fibers, in a preferred embodiment, comprise about 15 to 50% by weight high wet modulus rayon, with the remainder other fiber, such as polyester.

In one presently preferred exemplary embodiment, a one ounce per square yard non-woven fabric comprises 35% acrylic binder and 65% fiber, the fiber comprising 42.5% 1.5 denier polyester, 42.5% 1.2 denier polyester and 15% 1.5 denier high wet modulus rayon. Such a fabric exhibits the desirable soft hand associated with polyester and also the dimensional stability and suitability for use in fused construction characteristic of the present invention.

In the drawings and this specification there has been set forth the best mode presently contemplated for the practice of the invention. Although specific terms are employed, they are used in a generic and descriptive sense only, and not for the purposes of limitation, the scope of the invention being defined in the following claims.

I claim:

1. A fusible interlining fabric comprising a weft-inserted knitted fabric having a stitch yarn and a weft-inserted yarn, the weft-inserted yarn of said fabric comprising high wet modulus rayon.

2. A fusible interlining fabric in accordance with claim 1, wherein said weft-inserted yarn comprises from about 30% to 100% high wet modulus rayon.

3. A fusible interlining fabric in accordance with claim 2, wherein said weft-inserted yarn comprises in excess of 75% high wet modulus rayon.

4. A fusible interlining fabric in accordance with claim 2, wherein said stitch yarn comprises multifilament polyester yarn.

5. A fusible interlining fabric in accordance with claim 2, wherein the stitch yarn comprises multifilament nylon yarn.

6. A fusible interlining fabric in accordance with claim 2, wherein the stitch yarn comprises multifilament polyester/nylon yarn.

7. A fusible interlining fabric in accordance with claim 2, wherein said weft-inserted yarn comprises a blend of about 50% polyester and 50% high wet modulus rayon.

8. A fusible non-woven interlining fabric comprising an intimate blend of fibers, said fibers comprising high wet modulus rayon and other fibers, said fibers being held by a binder.

9. A fusible interlining fabric in accordance with claim 8, wherein high wet modulus rayon comprises from about 15% to 50% of said fibers.

10. A fusible interlining fabric in accordance with claim 8, wherein said binder is acrylic.

11. A fusible interlining fabric in accordance with claim 8, wherein said fibers are carded.

12. A fusible interlining fabric comprising an intimate non-woven blend of fibers, said fibers being held by a binder and comprising about 65% by weight of the fabric, the remainder being a binder, said fibers comprising polyester and high wet modulus rayon, the high wet modulus rayon comprising about 15 to 50% of said fibers.

13. A fusible interlining fabric in accordance with claim 12, wherein said binder is acrylic.

* * * * *